Sept. 19, 1961  R. H. WILKINSON  3,000,565
CIRCUITS FOR OBTAINING FOUR QUADRANT ANALOGUE MULTIPLICATION
Filed April 10, 1957  3 Sheets-Sheet 1

INVENTOR
ROBERT H. WILKINSON
BY
ATTORNEYS

Sept. 19, 1961  R. H. WILKINSON  3,000,565
CIRCUITS FOR OBTAINING FOUR QUADRANT ANALOGUE MULTIPLICATION
Filed April 10, 1957  3 Sheets-Sheet 2

INVENTOR
ROBERT H. WILKINSON
BY
ATTORNEYS

Sept. 19, 1961   R. H. WILKINSON   3,000,565
CIRCUITS FOR OBTAINING FOUR QUADRANT ANALOGUE MULTIPLICATION
Filed April 10, 1957   3 Sheets-Sheet 3
FIG. 8
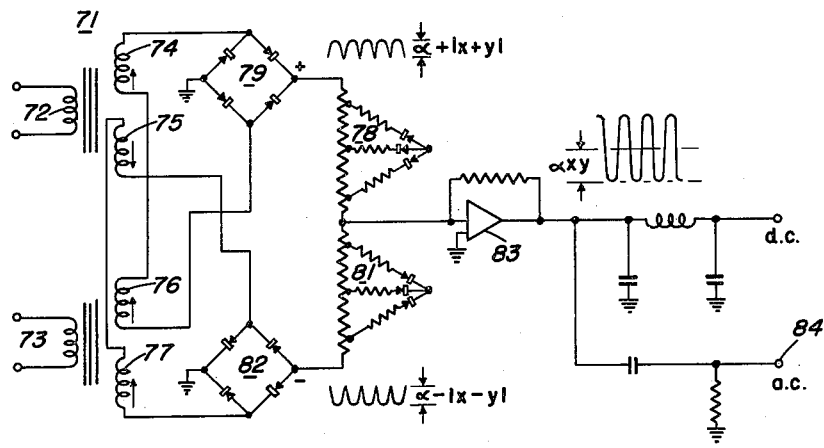
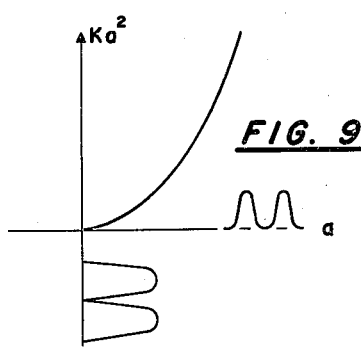
FIG. 9
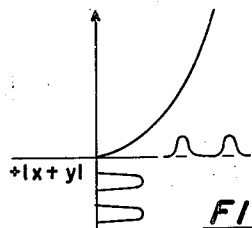
FIG. 11a
FIG. 11b
FIG. 11c
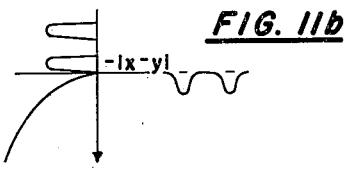
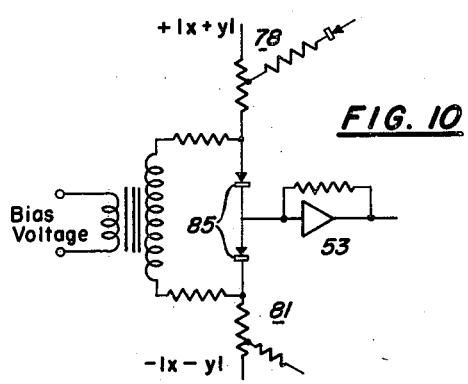
FIG. 10
INVENTOR
ROBERT H. WILKINSON
BY
ATTORNEYS

United States Patent Office 3,000,565
Patented Sept. 19, 1961

3,000,565
CIRCUITS FOR OBTAINING FOUR QUADRANT
ANALOGUE MULTIPLICATION
Robert H. Wilkinson, Baltimore, Md., assignor, by mesne assignments, to the United States of America as represented by the Secretary of the Navy
Filed Apr. 10, 1957, Ser. No. 652,074
2 Claims. (Cl. 235—178)

The present invention relates to circuits for obtaining four quadrant analogue multiplication and more particularly to circuits for four quadrant analogue multiplication including saturable reactors and diode shaping networks.

The two common types of shaping network multipliers are the logarithm type and the squaring type. The logarithm type will handle any reasonable number of inputs, whereas the squaring type will handle only two. However, two squaring types are not much more complicated than one, three input logarithm multiplier and are considerably more versatile. The logarithm type has two conversions, from input signals to logarithms, and back from logarithms to output signals. The logarithm network is much more difficult to construct than the squaring network.

An advantage of the squaring type multipliers is that they operate on inputs passing through zero. This is not possible with logarithm types.

The principle of multiplying known as the squaring method (also called the "square summing" type) is as follows: If $x$ and $y$ are two quantities to be multiplied and are available in electrical analogue form, the quantities $(x+y)$ and $(x-y)$ are obtained. These quantities are squared and the difference is taken, i.e., $$(x+y)^2 - (x-y)^2 = 4xy$$

In order to generate a quantity $(x \pm y)^2$ from $(x \pm y)$ where the quantity inside the parentheses may range from positive to negative a transfer characteristic curve is required which will given an output signal $+a^2 = (x \pm y)^2$ when a signal $\pm a = (x \pm y)$ is applied.

The D.C. output voltage of a saturable reactor when fed into a constant load will always be posible regardless of the polarity of the input signal.

Since in squaring multiplier systems which employ diode shaping networks which are passive in nature only positive signals may be applied to the diode shaping networks, an object of the present invention is the provision of a novel circuit which will always provide a positive output signal regardless of the polarity of the input signal.

Another object of the invention is to provide a circuit for obtaining four quadrant analogue multiplication wherein saturable reactor circuit means are employed for producing a signal which will always be accepted by a diode shaping network.

A further object of the invention is the provision of a four quadrant analogue multiplier wherein transformer circuit means are employed for producing a signal which will always be accepted by a diode shaping network.

Other objects and many of the attendant advantages of this invention will be readily appreciated as the same becomes better understood by reference to the following detailed description when considered in connection with the accompanying drawings wherein:

FIG. 8 is a schematic diagram of a third embodiment of the invention.

FIGS. 9, 11a, 11b, and 11c are graphs of transfer curves, and

FIG. 10 is a modification of the invention shown in FIG. 8.

Figure 1:
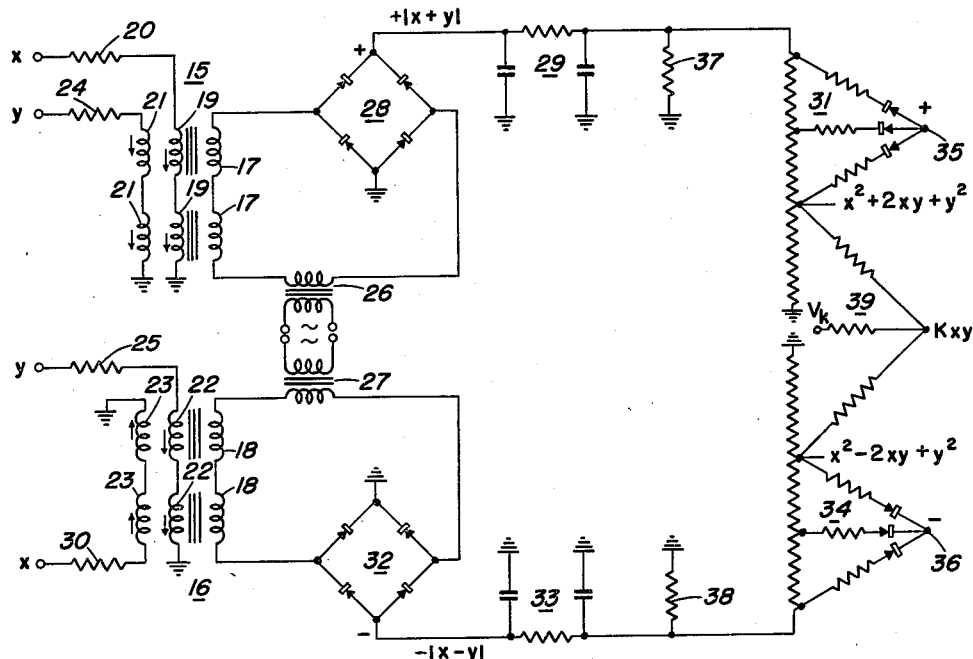
FIG. 1 is a schematic diagram of one embodiment of the invention.

Referring now to the drawings, wherein like reference characters designate like or corresponding parts throughout the several views, there is shown in FIG. 1 saturable reactors 15 and 16 having load windings 17 and 18 respectively. Reactor 15 has signal windings 19 and 21 with relative polarity as indicated by the direction arrows, and reactor 16 has signal windings 22 and 23 with relative polarity as indicated by the direction arrows. Signal windings 19, 21, 22, and 23 are connected in series respectively with resistors 20, 24, 25, and 30. Power for reactors 15 and 16 is supplied from a constant alternating current source, not shown, through transformers 26 and 27 respectively.

The output of reactor 15 is connected through rectifier 28 and filter circuit 29 to a square shaping network 31. The output of reactor 16 is connected through rectifier 32 and filter circuit 33 to the square shaping network 34. Square shaping networks 31 and 34 are shown as the well known diode shaping networks. The proper output is obtained by applying the proper bias voltage at 35 and 36 respectively. Resistors 37 and 38 are dummy loads.

Figure 2:
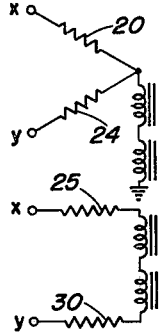
FIGS. 2 and 3 are modifications of the embodiment shown in FIG. 1.
Figure 3:
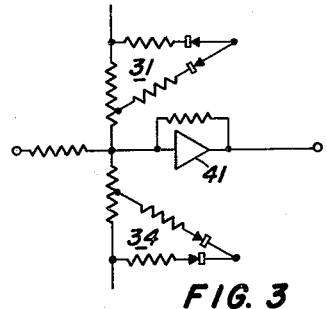
Figures 4A, 4B, 4C:
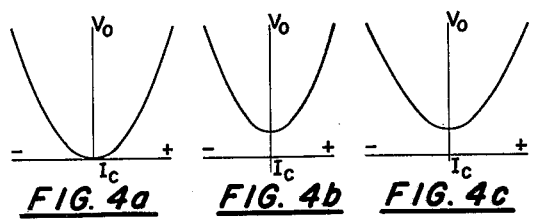
FIGS. 4a, 4b and 4c are graphs showing transfer curve characteristics.

In operation, the input signals $x$ and $y$ are direct current voltages. As shown by the direction arrows the signals $x$ and $y$ applied to signal windings 19 and 21 respectively are in adding relation and the output of reactor 15 is proportional to $x+y$. Also as indicated by the direction arrows the signals $x$ and $y$ applied to signal windings 23 and 22 respectively are in opposition to each other, therefore the output of reactor 16 is proportional to $x-y$. As shown in FIG. 4a the output voltage $V_0$ of a saturable reactor will always be positive whether the control current $I_c$ is positive or negative, therefore the input to the bridge rectifiers 28 and 32 will always be positive. The output from bridge rectifier 28 and input to diode shaping network 31 is $+|x+y|$ whereas the output from rectifier 32 and input to shaping network 34 is $-|x-y|$. The outputs of the shaping networks 31 and 34 are $x^2+2xy+y^2$ and $x^2-2xy+y^2$ respectively. These two functions are then subtracted in the resistance network 39, or they may be added in an operational amplifier 41 as shown in FIG. 3, to give an output $Kxy$ where K represents a constant. FIG. 2 shows an alternative way of adding the input signals by adding the signals directly.

Resistors 20, 24, 25 and 30 should be large compared to the resistance of the signal windings to minimize the temperature effects in the windings. They serve also as gain controls to balance the $x$ and $y$ current levels.

Figure 5:
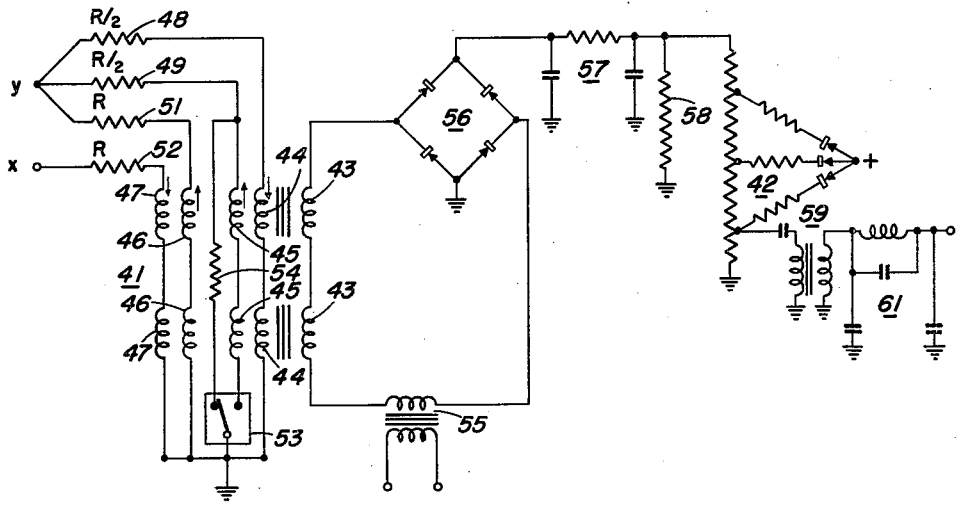
FIG. 5 is a schematic diagram of a second embodiment of the invention.

Dummy loads 37 and 38 are connected across the output of the reactors to absorb a large current compared with the shaping network, in order to minimize interaction between the saturable reactor and the shaping network.

Where direct current input signals are available, and an alternating current output signal is required the embodiment shown in FIG. 5 is employed. In this embodiment only one magnetic amplifier 41 and one shaping network 42 are required. The magnetic amplifier has load windings 43 and four sets of control windings 44, 45, 46 and 47, which latter are connected in series with resistors 48, 49, 51 and 52 respectively. The resistance of resistor 48 is equal to the resistance of resistor 49, and the resistance of resistor 51 is equal to the resistance of resistor 52. The resistance of each of resistors 48 and 49 is one half the resistance of each of resistors 51 and 52. A synchronous switch 53 (operating at the computing frequency with unity mark/space ratio) is connected alternately in series with windings 45 and a dummy load 54 which has a resistance equal to the resistance of windings 45. With a computing frequency of 500 c.p.s., a power source frequency of 10 kc. may be used. Power for the magnetic amplifier is supplied through a transformer 55 from an alternating source, not shown. The output of the saturable reactor is connected to the shaping network 42 through a bridge type rectifier 56 and filter network 57. A dummy load 58, is also connected across the output of the amplifier 41. The output from the shaping network 42 is coupled through a transformer 59 to a filter circuit 61.

Figure 7:
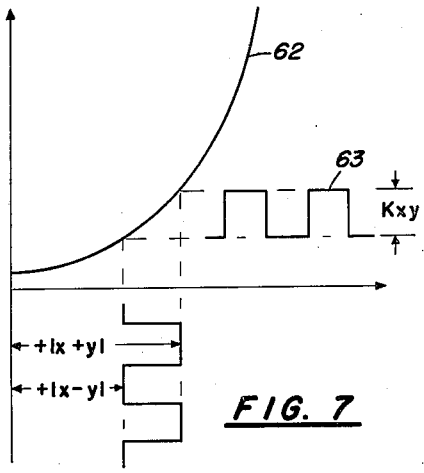
FIG. 7 is a graph showing the operation of the embodiment shown in FIG. 5.

In the operation of the circuit shown in FIG. 5, with the relay 53 in the position shown no current flows in windings 45. Winding 44 will have twice as much current flowing therein as windings 46. Since windings 44 and 46 are in bucking relation to each other, a resultant total flux will be produced proportional to $x+y$. When the relay is in the other position, current will flow in winding 45, thus a total flux will be produced proportional to $x-y$. As shown in FIG. 7, by switching back and forth between dummy load 54 and control windings 45 the square shaped output signal is obtained at the input to the square function generator 42. Curve 62 represents the transfer characteristics of the wave shaping circuit 42. The output from circuit 42 is represented by the curve 63. Therefore, a square modulated direct current signal is applied to the square function generator 42, giving an output signal whose alternating component has an amplitude proportional to the product $xy$, and a phase sense dependent on the sign of the product. This output is filtered to obtain the fundamental and may be fed into a buffer amplifier, not shown, which may be a tuned amplifier or a "virtual ground" type amplifier.

Figure 6:
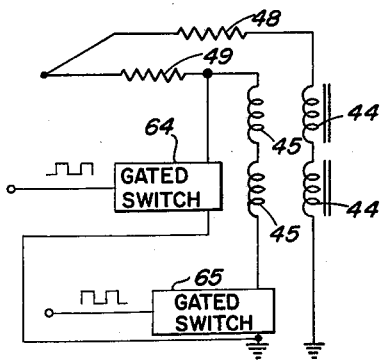
FIG. 6 is a modification of the embodiment shown in FIG. 5.

An alternative switching device is shown in FIG. 6. Switches 64 and 65 may be of the transistor type and may be gated from any convenient triggering source, not shown. Any residual currents in winding 45 may be opposed by a corresponding current in winding 44 (with temperature compensation).

FIG. 8 shows a third embodiment which can be used when alternating current signals are available as input quantities. There is shown a transformer 71 having input windings 72 and 73 and output windings 74, 75, 76 and 77. Windings 74 and 76 are connected in series aiding and windings 75 and 77 are connected in series opposing. Therefore, the output from 74 and 76 will be $x+y$ (assuming an input signal $x$ is applied to winding 72 and an input signal $y$ is applied to winding 73), and the output from windings 75 and 77 will be $x-y$. The output of windings 74 and 76 is connected to the square shaping network through the rectifier bridge 79. The output of windings 75 and 77 is connected to square shaping network 81 through the rectifier bridge 82. The outputs from the square shaping networks 78 and 81 are added in the summing amplifier 83.

If an alternating current output of double frequency is desirable, the above circuit without filtering will give a double frequency at terminal 84. This is true since the circuit in effect is generating $(\sin^2\theta)$, i.e., $$(x+y)^2(\tfrac{1}{2}-\tfrac{1}{2}\cos 2\theta)-(x-y)^2$$
$$(\tfrac{1}{2}-\tfrac{1}{2}\cos 2\theta)=2xy(1-\cos 2\theta)$$

This is illustrated in FIG. 9. The operation of FIG. 8 is as follows: an input signal $x$ at a frequency $f$ is applied to winding 72 and an input signal $y$ at a frequency $f$ is applied to winding 73. An output signal from rectifier 79 proportional to $+|x+y|$ is then combined with an output signal from rectifier 81 proportional to $-|x-y|$ in the summing amplifier 83.

If half wave rectification is desired the modification shown in FIG. 10 may be used. The operation of FIG. 10 is shown in FIGS. 11a, 11b, and 11c. FIG. 11a shows the output signal from rectifier 79 applied to the shaping network 78. FIG. 11b shows the output signal from rectifier 82 applied to the shaping network 81. FIG. 11c shows the waveshape of the added output signals shown in FIGS. 11a and 11b. The outputs from the shaping networks 78 and 81 are connected to a rectifying network 85. The rectified outputs are added as shown in FIG. 10 to obtain the output wave shown in FIG. 11c.

Obviously many modifications and variations of the present invention are possible in the light of the above teachings. It is therefore to be understood that within the scope of the appended claims the invention may be practiced otherwise than as specifically described.

What is claimed is:

1. In a circuit for four quadrant analogue multiplication, the combination comprising means for deriving the sum and difference of a first and a second input signal; said means comprising a saturable reactor having first, second, third and fourth control windings, said first input signal being coupled to said first control winding and said second input signal being coupled to said second, third and fourth control windings, said first and fourth control windings having the same relative polarity and said second and third control windings having the same relative polarity but opposite to that of said first and fourth control windings, said first and second control windings each having a resistor connected in series therewith, said third and fourth windings each having a resistor connected in series therewith which has a value one half the value of each of the resistors connected in series with said first and second control windings, a dummy load connected to one side of said third control winding and to a relay, the other side of said third control winding being connected to said relay whereby the circuit in which said third control winding is connected is alternately opened and closed, the opening and closing of said circuit providing a resultant control signal in said reactor which is alternately proportional to the sum and difference of said input signals.

2. In a circuit for four quadrant analogue multiplication, the combination comprising saturable reactor means for deriving the sum and difference of first and second input signals, said saturable reactor means comprising a saturable reactor having first, second, third and fourth control windings, said first input signal being coupled to said first control winding and said second input signal being coupled to said second, third, and fourth control winding, said first and fourth control windings having the same relative polarity and said second and third control windings having the same relative polarity but opposite to that of said first and fourth control windings, said first and second control windings each having a resistor connected in series therewith, said third and fourth windings each having a resistor connected in series therewith which has a value one half the value of each of the resistors connected in series with said first and second control windings, a dummy load connected to one side of said third control winding and to a relay, the other side of said third control winding being connected to said relay whereby the circuit in which said third control winding is connected is alternately opened and closed, the opening and closing of said circuit providing a resultant control signal in said reactor which is alternately proportional to the sum and difference of said input signals.

References Cited in the file of this patent

UNITED STATES PATENTS 2,574,438     Rossi et al.            Nov. 6, 1951

(Other references on following page)

UNITED STATES PATENTS 2,769,137 Creusere _____ Oct. 30, 1956
2,810,519 Creusere _____ Oct. 22, 1957

OTHER REFERENCES

Communications & Electronics, Davis et al., January 1955, pp. 635–640.

Acta Phys. Austriaca, Harmuth, July 1954, pp. 332–337.

Review of Scientific Instruments, Chance, September 1951, pp. 683–688.

Proc. of the IEE, MacKay, October 1954, Part B, pp. 611 and 612.